United States Patent
Bahammam

(10) Patent No.: US 11,175,087 B1
(45) Date of Patent: *Nov. 16, 2021

(54) METHOD FOR MEASURING DEFROST TIME IN A REFRIGERATION SPACE

(71) Applicant: King Abdulaziz University, Jeddah (SA)

(72) Inventor: Laila Ahmed Salim Bahammam, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

This patent is subject to a terminal disclaimer.

(21) Appl. No.: 17/389,452

(22) Filed: Jul. 30, 2021

Related U.S. Application Data

(63) Continuation of application No. 17/313,418, filed on May 6, 2021, now Pat. No. 11,125,489, which is a continuation of application No. 16/117,878, filed on Aug. 30, 2018, now Pat. No. 11,067,330.

(51) Int. Cl.
*G04F 13/06* (2006.01)
*F25D 21/00* (2006.01)

(52) U.S. Cl.
CPC ........... *F25D 21/008* (2013.01); *G04F 13/06* (2013.01); *F25D 2600/02* (2013.01)

(58) Field of Classification Search
CPC ... G04F 1/04; G04F 1/06; G04F 13/06; F25D 21/008; F25D 2600/02
See application file for complete search history.

(56) References Cited

U.S. PATENT DOCUMENTS

| | | |
|---|---|---|
| 3,063,235 A | 11/1962 | Winchell |
| 4,144,834 A | 3/1979 | Donegan |
| 4,474,481 A | 10/1984 | Croyle |
| 4,844,622 A | 7/1989 | Weiss |
| D405,114 S * | 2/1999 | Hossfeld .................. D19/62 |
| 5,924,294 A | 7/1999 | Tiby |
| 6,916,116 B2 | 7/2005 | Diekmann |
| 9,217,676 B2 * | 12/2015 | Laurain ................. G01K 11/06 |
| 9,410,730 B1 | 8/2016 | Keefe |
| 11,067,330 B2 * | 7/2021 | Bahammam .......... F25D 21/008 |
| 2004/0257918 A1 | 12/2004 | Ribi |
| 2006/0114754 A1 | 6/2006 | MacDonald |
| 2009/0129434 A1 | 5/2009 | Creus et al. |

(Continued)

FOREIGN PATENT DOCUMENTS

FR 2 676 532 11/1992

OTHER PUBLICATIONS

Oro, et al. ; Review on phase change materials (PCMs) for cold thermal energy storage applications ; Applied Energy 99 (2012) pp. 513-533 ; 2012 ; 21 Pages.

(Continued)

*Primary Examiner* — Sean Kayes
(74) *Attorney, Agent, or Firm* — Oblon, McClelland, Maier & Neustadt, L.L.P.

(57) ABSTRACT

A defrost or thaw measuring device has a dumbbell or hourglass-shaped rotatable compartment with a cavity, the cavity being partly filled with at least two phase change materials having different melting points. The measuring device may determine the time period of thawing at two or more temperature intervals in the refrigeration space.

4 Claims, 6 Drawing Sheets

(56) References Cited

U.S. PATENT DOCUMENTS

2012/0163133 A1* 6/2012 Gonzales .................. G04F 1/06
  368/10
2014/0373772 A1 12/2014 Laurain

OTHER PUBLICATIONS

Sharma, et al. ; Review on thermal energy storage with phase change materials and applications ; ScienceDirect ; Renewable and Sustainable Energy Reviews 13 (2009) pp. 318-345 ; 2009 ; 29 Pages.
Zalba, et al. ; Review on thermal energy storage with phase change: materials, heat transfer analysis and applications ; ScienceDirect ; Applied Thermal Engineering 23 (2003) pp. 251-283 ; 2003 ; 33 Pages.

* cited by examiner

METHOD FOR MEASURING DEFROST TIME IN A REFRIGERATION SPACE

CROSS-REFERENCE TO RELATED APPLICATIONS

The present application is a Continuation of U.S. application Ser. No. 17/313,418, having a filing date of May 6, 2021, which is a Continuation of U.S. application Ser. No. 16/117,878, now U.S. Pat. No. 11,067,330, having a filing date of Aug. 30, 2018.

BACKGROUND OF THE INVENTION

Field of the Invention

The application relates to the preservation and/or evaluation of frozen items, particularly foodstuffs, subject to warming from a cooled status.

Description of the Related Art

For cooled materials, particularly those subject to cooling by a power source, such as an electricity grid, losses of power can lead to suspensions of cooling and potentially damaging thawing of the cooled material(s). For example, when a person is underway and/or away from the site of the cooled material(s), such as traveling or working, electricity at home could be interrupted or cut off for periods of minutes, hours, or even days, which may, for example, affect refrigerated and frozen food in the refrigerator or freezer. When the power comes back on, it can happen that the food is chilled and/or refrozen without a person's noticing the outage or period of suspended cooling.

This scenario can apply to any type of cooling equipment, such as in factories, storage facilities, or sales points (e.g., supermarkets). With current refrigerators, an operator/owner cannot easily notice and/or determine if the food has been thawed or exposed to an increase in temperature. Attempts have been made to address this situation.

CH 625618 to Bekhechi discloses an apparatus for checking and monitoring the temperature prevailing inside a freezer consisting of a receptacle in the shape of an egg-timer containing a colored substance whose melting temperature is substantially equal to a set-point temperature of the order of −10° C. Bekhechi's apparatus is placed in a freezer in a position such that the substance in the solid state is separated from the bottom of the receptacle. In the case of reheating, Bekhechi's substance liquefies and flows to the bottom of the receptacle. Bekhechi's apparatus purports to be re-usable after melting of the substance, in contrast to known apparatuses consisting of spherical receptacles containing grains of a substance which can liquefy during reheating.

While Bekhechi appears to disclose (flattened) hour-glass shaped devices, alongside regular tetrahedal shapes, as well as a separating grid or internal partition between two chambers, Bekhechi's device has no means of installation inside the refrigerator and Bekhechi fails to explain whether the device can be used inside the freezer. In addition, Bekhechi's device cannot be rotated and cannot measure the period of cooling interruption, i.e., how long the food was subjected to non-cooled, higher temperature.

FR 267 6532 attempts to solve the cooling suspension problem with a complex design and requires filling with water from above, which may cause leakage. In addition, FR 267 6532 does not explain how to dispose of melted water from the lower chamber before filling the upper one, and it likewise fails to measure the number of hours in which the temperature has increased.

U.S. Pat. No. 9,410,730 to Keefe discloses a container with a porous support member affixed inside the container, defining upper and lower chambers, and a liquid partly filling the container. The liquid is frozen in the upper chamber. Keefe's container is oriented so that the upper chamber is gravitationally above the lower chamber, wherein the frozen liquid remains in the upper chamber. Keefe's container is placed in a cold zone of a freezer, and the presence of the liquid in Keefe's lower chamber indicates that a thaw episode has occurred. Keefe's indicator includes a container with an inner space, which is divided into an upper chamber and a lower chamber by a porous support member, wherein a liquid with a colored marker partly fills the inner space. Keefe's indicator can include a graduated scale that is placed onto the container wall of the indicator for measuring a depth of melt water during a thaw event.

However, Keefe does not suggest anything beyond a cylindrical shape for its indicator, e.g., no dumbbell-shape, and its container is not clearly rotatable. Moreover, Keefe's device is configured to hook to a shelf of cooling device, and hang from the shelf. Keefe's device is thus not releasably and rotatably attached to a wall of the refrigeration space, e.g., with a pin, magnet, or the like. Keefe likewise fails to disclose two or more miscible phase change materials (PCMs) in the container, nor PCMs suitable for determining the time period of thawing at two or more temperature intervals.

U.S. Pat. No. 3,063,235 to Winchell discloses a transparent container of water or other liquid in which is transversely disposed a spider or screen member. Winchell's device may have a pin with a ball head, connecting it near its center, to a suction cup, allowing attachment to a freezer door or wall, and inverted or turned in a vertical plane. Winchell's device may be inserted in a freezer in an inverted position so that the water or other liquid freezes to ice located at one end of the container, then be turned right side up, and, if the refrigeration unit is temporarily inactive due to interruption of its power supply or for other reasons, the ice in the container will slowly melt and the water or other liquid will drain through the screen to the empty lower portion of the container. The quantity of water or other liquid in Winchell's container is said to measure of the length of time that the food has defrosted.

However, Winchell's device is generally a cylindrical or prismic shape, not a dumbbell shape container. Additionally, Winchell appears limited to the use of one phase change material, such as water, and does not disclose using at least two miscible PCMs in the container to be able to determine the time period of thawing at two or more temperature intervals.

U.S. Pat. No. 4,844,622 to Weiss discloses a resettable reusable time temperature recording thermometer instrument for tracking and recording temperature excursions in commercial refrigeration environments comprises a closed vessel having two chambers and metering orifice between the chambers and a time measurement/recording means with a scale to indicate the total time duration of liquid flow through the orifice from one chamber to the other; and an assembly of such vessels with fill liquids of different freezing point temperatures. Weiss's device(s) may be hour-glass shaped, and optionally made of a wide variety of translucent or transparent materials such as glasses and plastics. Weiss may use a fill material of selected from a wide variety of organic or inorganic materials having requisite sharp melting point temperatures, preferably ethylene glycol diluted with water.

However, Weiss does not suggest attaching its device or array to an axis, attachable to a cooling unit wall, allowing vertical rotation of its system, nor does Weiss disclose a permeable layer between its chambers. In addition Weiss requires an equilibration tube to allow gas pressurization between its chambers. Although Weiss describes two miscible liquids, i.e., water and ethylene glycol, Weiss uses such solutions to establish multiple container arrays of different melting sharp points, rather than as a single solution or mixture of PCMs to measure two or more temperature intervals.

U.S. Pat. No. 5,924,294 to Tiby discloses a self-contained device and method for determining the variations in temperature regulated temperature enclosures. Tiby's device consists of a container comprising a tank connected to a receptacle, the inner spaces of which communicate with one another through one or two ducts of reduced or constricted cross sections, in a sort of hour-glass shape. Tiby's container is formed at least partially of a material allowing heat transfer with the exterior and contains an initially solidified material, the melting temperature of which is constant and the total volume is no more than the overall volume of the tank and duct element.

Tiby's container can be turned upside down or pivoted through 180°, but Tiby does not teach an axis upon which it could be rotated and/or attached to a wall. While Tiby discloses a means of retaining a substance in the solid state between two chambers, Tiby does not disclose a planar permeable barrier or frit. Instead, Tiby's substance retainer consists of a plate with perforations or asperities, and a surface "approximately perpendicular" to gravity whose perimeter allows the melted substance to flow from its reservoir into a receptacle along the reservoir wall without directly blocking the two conduits, portraying these with vertical portions and complicated designs, beyond simple planes. Also, while the material contained in Tiby is a eutectic that may be a mixture of two or more constituents, Tiby's eutectic always has a fixed melting temperature and a constant composition for a given mixture. Tiby's substance may be in pure state, such as water, to fulfill its function, with the constancy of its melting temperature at a given pressure when it has been frozen, rather than as a single solution of PCMs to measure two or more temperature intervals. Tiby does not disclose being able to determine the time period of thawing at two or more temperature intervals with a single solution at least two (miscible) PCMs in its vessel.

US 2009/0129434 A1 by Creus and Rihoux discloses a method and device for detecting a temperature rise, in particular a preservation temperature, in a cooler designed for preserving products, comprising liquefying a detection substance, contained in a first zone, by a temperature rise and moving the liquefied detection substance into a second zone of the chamber to enable the temperature rise to be detected. Creus's device has a container with a first and a second compartment, a detection substance, and floating components for quantifying the displaced volume of the liquefied detection substance to determine the rise in temperature that has occurred inside a cold chamber. Creus's device may have an articulated arm, attached to a suction cup, which may attach to a wall of the cold chamber and allow the device to be pivoted or inverted vertically. Creus's detection substance may be a mixture of water and an alcohol or a polyol, e.g., water/glycerol, a water/isopropanol; an oily substance/saccharose, water/sucrose/fructose/saccharose, or water/propylene glycol However, Creus teaches relatively complex shapes or rectangular prism, not a dumbbell-shaped container, nor any shape which can be rotated upon an axis. In addition, Creus does not disclose at least two (miscible) PCMs in the vessel able to determine the time period of thawing at two or more temperature intervals.

U.S. Pat. No. 4,144,834 to Donegan discloses a thaw-indicating device that is visibly positioned in a package of frozen food so to warn a consumer if the food item has ever been subjected to being thawed, and thus being spoiled even if refrozen subsequently. Donegan's device consists of a transparent plastic capsule having a sealed singular compartment in one end of which there is a colorless, clear, frozen ice and in the other end of which there is a powdered dye that is soluble in water, so that if the ice melts into water due to thawing temperatures the entire interior of the capsule is visibly colored. However, Donegan's defrost indicator is merely a disposable element, not configured to attach to a cooling device, but rather the object to be cooled. Donegan's defrost indicator is not rotatable and is only pill-shaped, i.e., cylindrical with rounded ends, for embedding in a cooled product.

Previous approaches to the problems discussed above generally have complex designs, lack ease of rotatability and attachability onto a cooling device wall, and/or do not measure of the time that the food was subjected to increased temperature and/or suspended cooling, e.g., from interrupted power in a cooling device, wherein the period of thawing can be measured at two or more temperature intervals.

SUMMARY OF THE INVENTION

Devices within the scope of the invention may comprise: an elongated compartment including a first end and a second end separated by a side wall along a longitudinal axis of the elongated compartment, thereby forming a cavity including a first chamber and a second chamber that are fluidly connected through a narrow section located between the first and second chambers, wherein at least a portion of the elongated compartment is made of a first transparent material; a liquid, comprising a first phase change material and a second phase change material, disposed in the cavity; a base to which the elongated compartment is releasably and rotatably attached, the base being configured to mount the elongated compartment to a wall; and a graduation arranged on an outside surface of the elongated compartment suitable for measuring a liquid level in the elongated compartment, wherein the first and second chambers are symmetric to each other, and wherein the device is configured to determine a defrost time period for two or more temperature intervals in a cooled space.

Inventive devices may further comprise a planar permeable structure disposed at the narrow section and configured to prevent a movement of a solidified liquid from one chamber to another when the elongated compartment is vertically oriented.

The first transparent material may comprise quartz, glass, polyethylene terephthalate, polybutylene terephthalate, polyacrylate, polymethacrylate, polyethylene, polypropylene, polyvinyl chloride, polyethernitrile, polyethersulfone, polystyrene, polycarbonate, polymethylmethacrylate, styrene-acrylonitrile, styrene-methyl methacrylate, methyl methacrylate-butadiene-styrene, or a two or more of any of these. The liquid may comprise water and, beyond the phase transfer materials (PCMs), may further comprise a coloring dye.

The first and second chambers each include a cylindrical or prismic portion including a taper toward the narrow section. For example, the elongated compartment may configured in the shape of a dumbbell or an hour glass.

Inventive devices and/or elongated compartments may be configured to rotate about a central axis orthogonal to the base. The base may include a single joint about which the elongated compartment is configured to rotate, or the base may include a first joint and a second joint (or more joints) about which the elongated compartment is configured to rotate.

The first phase change material and the second phase change material may each be a hydrocarbon. The first phase change material may be an organic or inorganic salt, and the second phase change material may be water. The liquid further comprises a third phase change material. All phase change materials in the liquid may be miscible in each other.

The two or more temperature intervals measured by the device may be in a range of from −20 to 10° C., and/or may be spaced by at least 5° C.

Inventive devices may further comprise a shell enclosing the elongated compartment and/or a transparent housing enclosing the device components in the space orthogonally outwards from the wall and base. The shell and/or the housing may be selected from the same group of transparent materials as the elongated compartment, and the second transparent material (of the shell) and/or the third transparent material (of the housing) may be of a different material from the first transparent material (of the elongated compartment). The materials of construction are preferably both resilient and strong to prevent breakage.

The base may comprise a magnet configured to attach the device to the wall.

Aspects of the invention provide methods of measuring a time period of defrosting in a refrigeration space, comprising mounting a measuring device, such as any device described herein, to a wall of the refrigerated space and vertically aligning the elongated compartment by rotating the elongated compartment around a pin releasably and rotatably attached to the elongated compartment to the base, allowing the liquid to freeze in a chamber located at a bottom of the elongated compartment to form a solidified liquid; rotating the elongated compartment around the pin to substitute a position of the chamber located at the bottom of the elongated compartment with a chamber located at a top of the elongated compartment, wherein the solidified liquid melts when a temperature of the refrigeration space rises above a predetermined temperature in a range of from −20 to 10° C., and the liquid is collected in the chamber located at the bottom of the elongated compartment; measuring a liquid level of the liquid that is collected in the chamber located at the bottom of the elongated compartment with the measuring tape; and measuring the defrost time period in the cooled space from the liquid level.

The time period of defrosting in the refrigeration space may be measured with a calibration curve that correlates the liquid level to the time period of defrosting.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
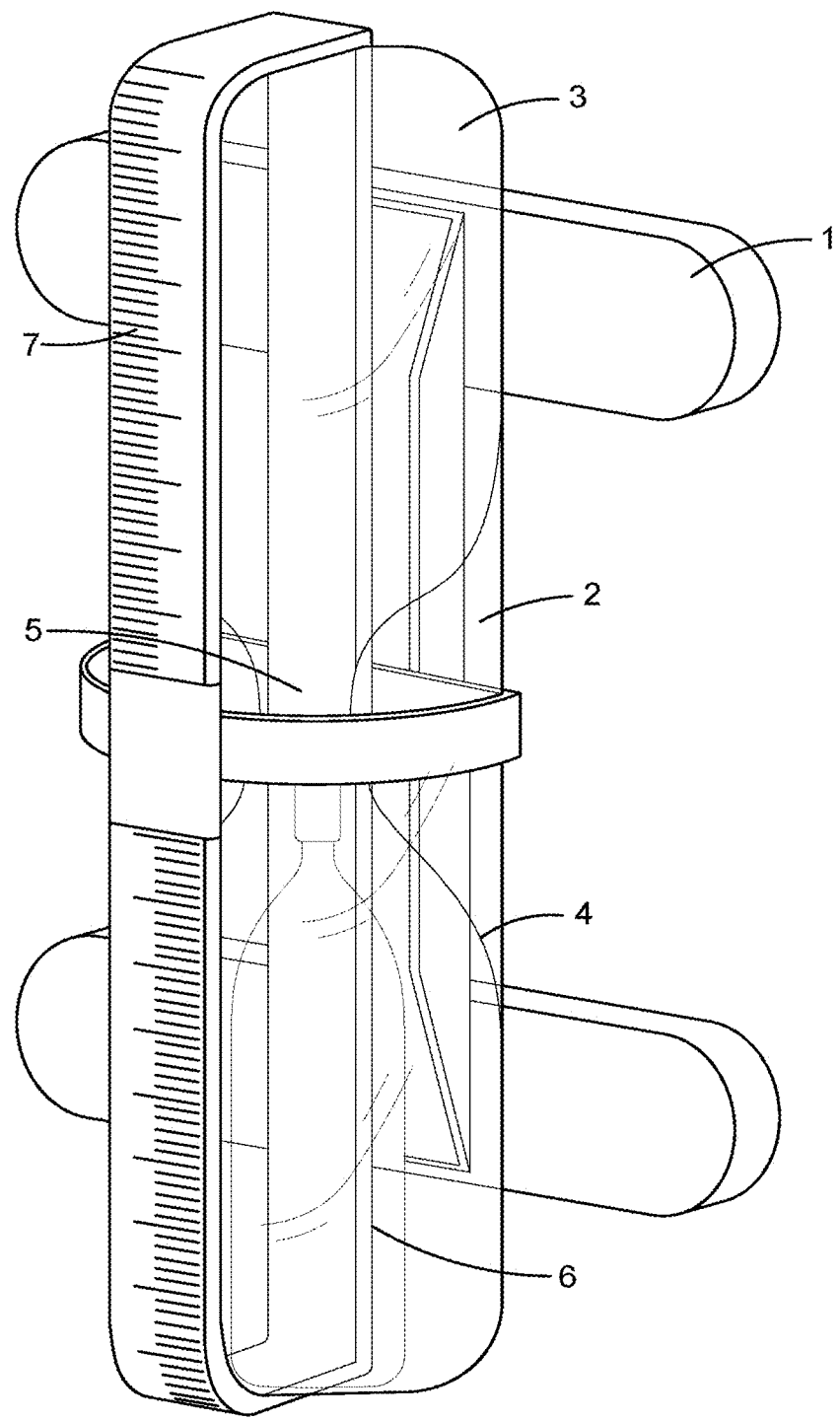
FIG. 1 shows a right front perspective view of a device within the scope of the invention.

Devices within the scope of the invention may be installed in refrigerator, freezer, or any other cooling device, and can measure the duration of suspended cooling, often associated with a temperature rise, using, e.g., an external graduation measuring the level of melted liquid, optionally after the melted liquid resolidifies. Approaches within the invention may allow the vessel to completely melt the liquid and then place the measuring device inside the cooling device until it freezes and then turn it in place.

Inventive devices herein generally have simple designs and are easy to use. Such devices may be configured for (optionally temporary) installation in a refrigerator, freezer, or other cooling device, or even in a preservation container, such as a common cooler or an organ transplant transporter. Inventive devices can measure the duration of temperature rise and/or the temperature reached within the cooling device/cooler. Inventive measuring devices may also indicate the viability of food affected by the suspension in cooling, e.g., in hours, minutes, and/or seconds. Inventive devices allow a solidified liquid comprising phase change materials (PCMs) to melt in an elongated compartment, place the elongated compartment into the cooling device/cooler until it freezes, then turn the measuring device in place. Alternatively, the PCM liquid can be frozen in advance, then placed into the cooling device/cooler. The PCM liquid may be reused and need not be disposed, and the elongated compartment may be supplied to the end consumer in a sealed, calibrated form. Therefore, it may be unnecessary to open and fill the measuring device, which may improve safety, cleanliness, and accuracy in measurement over known devices.

The graduation on inventive measuring devices may allow the user to know the value and/or duration of the temperature rise in minutes and hours. Using predetermined data on the properties of the objects to be cooled, i.e., tolerance to heat and/or temperature of particular types of food, medicine (chemical, biological, or otherwise), or biological material (tissues, blood components, gametes, biological medicine), the user may ascertain the viability (health) of the refrigerated material subject to suspended cooling. Such viability evaluation can be determined by tables based upon available data on temperature-dependent storage life of the cooled material(s), or using software/applications on computerized devices, such as laptops, cell phones, tablets, or even directly onto an electronic display embedded in the cooling device which accesses and/or contains a database of the information on the thermodynamic and temperature tolerance of the cooled materials.

Aspects of the invention provide a measurement method or device useful for measuring the status of the cooled materials and suitable for installation—temporary or permanent—in cooling devices, such as refrigerators, freezers, or deep freezers, or in insulating containers, such as coolers, dewars, biologic tissue preservation or transport container, or the like. Inventive devices and methods are useful for recording suspended cooling and consequently viability of the cooled materials, particularly foods, by calculating the amount of time and/or temperature such refrigerated materials were exposed to raised temperature within the cooling device, even after restoration of power and/or cooling. That is, food could be re-chilled and/or re-frozen without it being recognized that an interruption of cooling occurred. Devices or methods as claimed can capture the suspended cooling event, even if the event would not have been recognizable externally to the cooling device.

Devices within the scope of the invention may comprise an elongated compartment including a first end and a second end separated by a side wall along a longitudinal axis of the elongated compartment, thereby forming a cavity including a first chamber and a second chamber that are fluidly connected through a narrow section located between the first and second chambers, wherein at least a portion of the elongated compartment is made of a first transparent material; a liquid, comprising a first phase change material (PCM) and a second PCM, particularly PCMs having different melting points, disposed in the cavity; a base to which the elongated compartment is releasably and rotatably attached, the base being configured to mount the elongated compartment to a wall; and a graduation arranged on an outside surface of the elongated compartment suitable for measuring a liquid level in the elongated compartment, wherein the first and second chambers are symmetric to each other, and wherein the device is configured to determine a defrost time period for two or more temperature intervals in a cooled space.

The liquid and/or components thereof change phase from solid to liquid depending upon temperature and the duration of exposure to temperatures beyond the melting/fusion point. While measurement of temperature and duration of exposure to higher (non-cooled) temperatures can be measured using inventive devices with a single phase change material (PCM), such as water, a combination of PCMs in the liquid can allow the measurement of whether certain temperature thresholds (two, three, four, or more) have been reached, and for how long. The liquid may include two or more PCMs which are miscible in each other, which is particularly useful when a permeable membrane/mesh separates the first and second chambers, or immiscible which is particularly useful when separation of the fluids and corresponding solid phases is desired. All PCMs of the liquid may be miscible, though none are required to be miscible, and it may be advantageous to use immiscible mixtures, e.g., to employ a Galileo-type thermometer effect in the measuring device. The Galileo-thermometer effect may also be achieved by suspending in the liquid insoluble objects of fixed density, e.g., glass spheres containing water, air, and/or chloroform. The liquid may comprise water as one of the PCMs or in addition to the PCMs. Beyond the phase transfer materials (PCMs), the liquid may further comprise a coloring dye. Exemplary PCMs, including selected commercially available formulations/materials, which could be useful within the scope of the invention, depending upon the temperature threshold of the cooling device to be monitored, are provided below in Table 1. The first PCM and the second PCM may each be a hydrocarbon. The first PCM may be an organic or inorganic salt, and the second PCM may be water. The first PCM may be an organic C2 to C22 (C3 to C18, C4 to C16, or C5 to C18) acid, and the second PCM may be a C8 to C22 (C10 to C21, C12 to C20, or C14 to C18) hydrocarbon. The liquid may further comprise a third PCM. The number of PCMs in the solution may be 2, 3, 4, 5, 6, or even 7. At least one PCM may be aqueous with a number of inorganic PCMs and the other PCM organic comprising one or more hydrocarbons.

Especially in the case when the device comprises two PCMs that are immiscible, a first PCM having a relatively higher melting point preferably has a density that is less than the density of a second PCM having a relatively lower melting point. In this configuration the device is installed with both PCM's in a liquid form as two separated phases. The separated phases are present in a lower compartment of the device and are subsequently cooled until both become solid. Turning the elongated compartment by 180° after solidifications of both PCMs forms a solid mass of the two-phase mixture. Melting of the first phase at a first critical temperature permits passage of the first phase through the narrow section (5) while permitting the lower melting PCM phase to remain in a solid-state in its original compartment. One or more of the immiscible PCMs may comprise a dye that is miscible or soluble in only one of the PCMs.

TABLE 1

| Substance | Temp (° C.) |
|---|---|
| 24.8 wt. % HCl (aq) | −86 |
| 24 wt. % LiCl (aq) | −67 |
| 30.5 wt. % CaCl$_2$ (aq) | −49.5 |
| 0100-Q-50 BioPCM[a] | −50 |
| 0100-Q-45 BioPCM[a] | −45 |
| 28.01 wt. % MgCl$_2$ (aq) | −33.5 |
| SN33 salt sol'n[b] | −33 |
| TH-31[c] | −31 |
| 30.5 wt. % Al(NO$_3$)$_3$ (aq) | −30.6 |
| MPCM (−30)[d] | −30 |
| SN29 salt sol'n[b] | −29 |
| SN26 salt sol'n[b] | −26 |
| 27.9 wt. % Li$_2$SO$_4$ | −23 |
| 22.4 wt. % NaCl (aq) | −21.2 |
| TH-21[c] | −21 |
| SN21 salt sol'n[b] | −21 |
| STL-21 salt sol'n[e] | −21 |
| SN18 salt sol'n[b] | −18 |
| TH-16[c] | −16 |
| STL-16[e] | −16 |
| SN15 salt sol'n[b] | −15 |
| SN12 salt sol'n[b] | −12 |
| STLN10 salt sol'n[e] | −11 |
| SN10 salt sol'n[b] | −11 |
| 19.7 wt. % KCl | −10.6 |
| diethylene glycol C$_4$H$_{10}$O$_3$ | −10.5 |
| TH-10[c] | −10 |
| 6 wt. % KCl (aq) | −10 |
| dodecane | −9.6 |
| 22.1 wt. % BaCl$_2$ (aq) | −7.7 |
| triethylene glycol C$_6$H$_{14}$O$_4$ | −7 |
| 16.5 wt. % KHCO$_3$ (aq) | −6 |
| STL-6 salt sol'n[e] | −6 |
| SN06 salt sol'n[b] | −6 |
| 18.63 wt. % MgSO$_4$ (aq) | −4.8 |
| tetradecane C$_{14}$H$_{30}$ + octadecane C$_{18}$H$_{38}$ | −4.02 |
| TH-4[c] | −4 |
| 20.5 wt. % Na$_2$CO$_3$ (aq) | −3 |
| STL-3 salt sol'n[e] | −3 |

TABLE 1-continued

| Substance | Temp (° C.) |
|---|---|
| SN03 salt sol'n[b] | −3 |
| 6.49 wt. % $K_2SO_4$ (aq) | −1.55 |
| 4.03 wt. % $Na_2SO_4$ (aq) | −1.2 |
| water $H_2O$ | 0 |
| $H_2O$ + polyacrylamide | 0 |
| 91.67% tetradecane + 8.33% hexadecane | 1.7 |
| tetradecane + docosane (C22) | 1.5 to 5.6 |
| Tetradecane + heneicosane (C21) | 3.5 to 5.5 |
| BioPCM Q4[a] | 4 |
| 31 wt. % $Na_2SO_4$, 13 wt. % NaCl 16 wt. % | 4 |
| C14 paraffin | 4.5 to 5.5 |
| tetrahydrofuran $C_4H_8O$ | 5 |
| BioPCM Q5[a] | 5 |
| tetradecanes | 5.5 |
| n-tetradecane | 5.8 to 5.9 |
| BioPCM Q6[a] | 6 |
| ClimSel C 7[f] | 7 |
| formic acid HCOOH | 7.8 |
| C15-16 paraffin | 8 |
| polyethylene glycol E400 | 8 |
| BioPCM Q8[a] | 8 |
| $LiClO_3 \cdot 3H_2O$ | 8.1 |
| RT5 paraffin[g] | 9 |
| pentadecane | 9.9 |
| C15 paraffin | 10 |
| propyl palmitate $C_{19}H_{38}O_2$ | 10 |
| $ZnCl_2 \cdot 3H_2O$ | 10 |
| isopropyl palmitate $C_{19}H_{38}O_2$ | 11 |
| BioPCM Q12[a] | 12 |
| capric-lauric acid + pentadecane (90:10) | 13.3 |
| isopropyl stearate $C_{21}H_{42}O_2$ | 14 to 18 |
| ClimSel C15[f] | 15 |
| $Mn(NO_3)_2 \cdot 6H_2O/MnCl_2 \cdot 4H_2O$ (4%) | 15 to 25 |
| $NaOH \cdot 3.5H_2O$ | 15.2 |
| caprylic acid $C_8H_{16}O_2$ | 16.3 |
| DMSO $(CH_3)_2SO$ | 16.5 |
| C16 paraffin | 16.7 |
| acetic acid $C_2H_4O_2$ | 16.7 |
| glycerin | 17.9 |
| $NaCl \cdot Na_2SO_4 \cdot 10H_2O$ | 18 |
| polyethylene glycol E600 | 20 |
| C16-18 paraffin | 20 to 22 |
| C17 paraffin | 21.7 |

[a]Phase Change Energy Solutions, Inc.;
[b]Cristopia;
[c]TEAP;
[d]Microtek Labs, Inc.;
[e]Mitsubishi Chemical Corporation;
[f]Climator Sweden AB;
[g]Rubitherm GmbH Further relevant PCMs will be known to the person of skill in the art, for example, from *Appl. Thermal Eng.* 2003, 23, 251-283, *Renewable & Sustainable Energy Rev.* 2009, 13, 318-345, and *Appl. Energy* 2012, 99, 513-533, each of which are incorporated in their entirety herein. Any PCM system may be useful herein, though particular value may be found in PCM systems suitable to assess a thaw at two or more temperature intervals.

The two or more temperature intervals measured by the device may be in a range of from −80 to 30° C., −50 to 20° C., −40 to 15° C., or −20 to 10° C. The temperatures measured by the measuring device will depend upon the material to be monitored, though most biological materials will have temperature targets of at most 10° C., or at most 7.5° C., 5° C., 2.5° C., 2° C., 1° C., 0° C. or −1° C. Of course, biological materials may not be infinitely coolable, so relevant bottom temperature targets may be −40° C., −30° C., −25° C., −20° C., of −15° C. The temperatures of the two temperature intervals may be spaced by 2.5° C., 5° C., 7.5° C., 10° C., or 15° C. The PCM liquid as used in measuring device typically does not have a single melting point.

The first PCM may have a melting/fusion point of about −20° C., −15° C., −10° C., −5° C., or 0° C., and the second PCM may have a melting/fusion point of about −15° C., −10° C., −5° C., 0° C., 5° C., or 8° C. Any value listed in Table 1 could be relevant melting points for PCMs herein, and, given that PCMs are presently being developed to target every temperature across the spectrum, particularly for refrigeration, freezing, and deep freezing applications, a person of skill in the art will readily recognize that devices according to the invention may be tailored to particular temperature ranges, taking into consideration the application under consideration. For example, the PCM selection will generally differ for monitoring frozen proteins or antibody samples, versus applications for frozen vegetables, ice cream, or even milk, or still further general household refrigeration. Industrial cooling or freezing operators may thus coordinate with a manufacturer of a measuring device as described herein to prepare a tailored monitoring device.

Inventive devices may further comprise a planar permeable structure, such as a glass frit, a wire net, a mesh, a permeable plastic membrane (PE, PP, PTFE, PVDF, etc.), disposed at the narrow section and configured to prevent a movement of a solidified liquid from one chamber to another when the elongated compartment is vertically oriented.

The first transparent material of the elongated compartment, or the second or third transparent materials of the optional shell and/or housing, may comprise quartz, glass, polyethylene terephthalate, polybutylene terephthalate, polyacrylate, polymethacrylate, polyethylene, polypropylene, polyvinyl chloride, polyethernitrile, polyethersulfone, polystyrene, polycarbonate, polymethylmethacrylate, styrene acrylonitrile, styrene methyl methacrylate, methyl methacrylate butadiene styrene, or a two or more of any of these. Besides fused quartz, the types of glass which may be used, depending upon the temperature of cooling, may be soda-lime glass, borosilicate glass, lead oxide glass, aluminosilicate glass, or even germanium oxide glass. As noted, inventive devices may further comprise a shell enclosing the elongated compartment and/or a transparent housing enclosing the device components in the space orthogonally outwards from the wall and base. The shell and/or the housing may be selected from the same group of transparent materials as the elongated compartment, and the second transparent material (of the shell) and/or the third transparent material (of the housing) may be of a different material from the first transparent material (of the elongated compartment). Practically, it is generally useful when the elongated body can be easily cleaned, e.g., in a dish washer.

Figure 2:
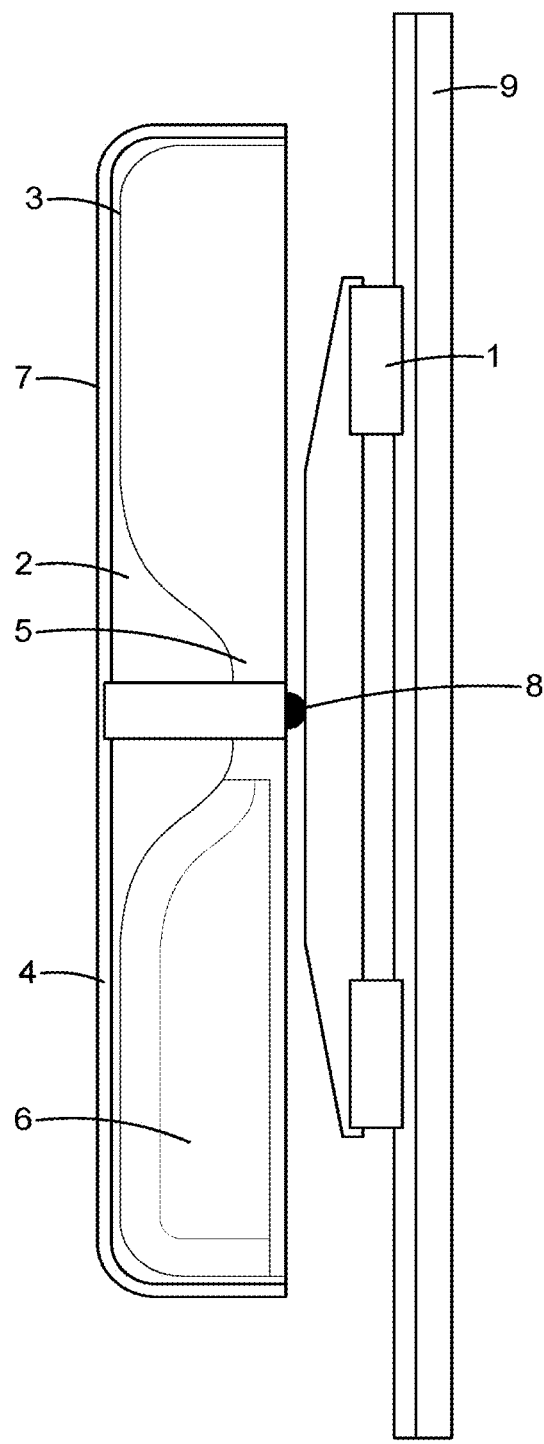
FIG. 2 shows a right side elevational view of a device within the scope of the invention including wall environment from a wall to which it is attached, e.g., a cooling device wall.

Inventive devices may be configured such that the first and second chambers each include a cylindrical or prismic portion including a taper toward the narrow section. For example, the elongated compartment may be configured in the shape of a dumbbell or an hour glass. As depicted in FIG. 2, the geometric shape of inventive devices may be flattened on one half. Inventive devices may also be substantially planar in a direction orthogonal to the wall of the cooling device/cooler, as such a design can advantageously reduce space requirements and/or improve the accuracy of visible measurements. A horizontal cross-section of the chambers, which will generally be mirror images of each other across the vertical center, viewed from top to bottom, may be rectangular, hexagonal, octagonal, ovular, ovular, circular, circular, or a half-form of any of these, such as a half-circular cross-section. When viewed from an front elevation in which the elongated compartment extends from top to bottom, down a central axis orthogonal to the base, the cross-section will generally taper toward the narrow section in a linear or curved manner. Preferred front elevational cross-sections may be hourglass or dumbbell shaped, depending upon the application, though the prominence of the wider portions may be reduced, and/or the elongated compartment further elongated in a top-to-bottom direction, to improve measurement accuracy.

In a simple form, an inventive measuring device may have a graduated, hourglass or dumbbell-shaped, elongated body with a single, central joint around which the elongated body is rotatable and with which the elongated body is detachable from a base. Such a measuring device, like any other herein, could suitably use a single substance PCM, but may advantageously employ more than one PCM in a single container.

Inventive devices may be configured such the entire device and/or the elongated compartment may be rotated about a central axis orthogonal to the base. The base may include a single joint about which the elongated compartment is configured to rotate, or the base may include a first joint and a second joint (or more joints) about which the elongated compartment is configured to rotate. For example, the elongated body, or the shell and/or housing covering the elongated body, may be attached with three joints to the base, which are located towards the top, at the vertical center, and towards the bottom. For simplicity, a single joint may be preferred. Guide posts or stoppers, e.g., made of elastomer such as butadiene, silicone, SBR, nitrile, etc., may be included on the base on either or both sides of the vertically centered rest position of the elongated body, as a guide for the user to align the measuring device for operation. The vertical alignment of the generally freely rotatable elongated body may be achieved by a segmented bearing joint, i.e., one that clicks or provides tactile feedback every, e.g., 15°, 30°, 45°, or 90°.

The base may take on any shape and form, but will generally tend towards planarity in a direction orthogonal to the wall. The base may be round, such as circular or ovular, rectangular, e.g., square, or may be in the form of one or more stripes/slabs so long as these are sufficient to host any necessary joints, stoppers, or wall attachments. The base may also be tailored to particular electronic cooling devices or insulated coolers, e.g., snap-fitting or fitting a wall indentation. The base may be attached to the wall in any conventional manner, and may be detachable from the wall. For example, the base may comprise a magnet or 2, 3, 4, or more magnets, configured to attach the device to the wall. Such a magnet may be ring-shaped, circular, or rectangular.

Aspects of the invention provide methods of measuring a time period of defrosting in a refrigeration space, comprising mounting a measuring device, such as any device described herein, to a wall of the refrigerated space and vertically aligning the elongated compartment by rotating the elongated compartment around a pin releasably and rotatably attached to the elongated compartment to the base, allowing the liquid to freeze in a chamber located at a bottom of the elongated compartment to form a solidified liquid; rotating the elongated compartment around the pin to substitute a position of the chamber located at the bottom of the elongated compartment with a chamber located at a top of the elongated compartment, wherein the solidified liquid melts when a temperature of the refrigeration space rises above a predetermined temperature in a range of from −80 to 30° C., −50 to 20° C., −40 to 15° C., or −20 to 10° C., and the liquid is collected in the chamber located at the bottom of the elongated compartment; measuring a liquid level of the liquid that is collected in the chamber located at the bottom of the elongated compartment with the measuring tape; and, optionally, measuring the defrost/thaw time period in the cooled space from the liquid level.

The evaluation of the defrost time may be built into the graduation, though a "smart" cooling device may be able to better estimate the mass and heat transfer properties of contents and/or environs of the cooling device, and, e.g., provide a prompt on an electronic screen for which a user enters a read-out from the measuring device, whereupon a database of food (or other cooled material) properties are consulted to directly instruct the user of the viability of the food (or other cooled material), e.g., that the food must be discarded as spoiled, or that its expiration date should be shifted forward, or even that the food was not affected.

The defrost/thaw time period of defrosting in the refrigeration space may be measured with a calibration curve that correlates the liquid level to the time period of defrosting. Such a calibration curve may be, e.g., in a handbook delivered with the measuring device and/or made available on the internet. The calculation may also be conducted by an application on a personal electronic device or by accessing a database or interface on the internet, e.g., a website, which conducts the calculation for the user. Such automated services may provide further entries, e.g., on the contents of the cooling device, which may improve the accuracy of the viability evaluation. If the user is aware of the tolerable temperature for particular foodstuffs or biological materials, an indication from a dual or triad temperature interval, indicating that one temperature was reached, but not a second or a third (consecutively higher) temperature, could immediately inform the user of the viability of the cooled material in question.

As can be inferred, inventive measuring devices and methods may find particular use in the cooling device(s) of households, manufacturers, hospitals, blood banks, merchants, chemical plants and retailer, commercial retailers, meat and frozen food packagers, etc.

Referring now to the drawings, wherein like reference numerals designate identical or corresponding parts throughout the several views.

Figure 3:
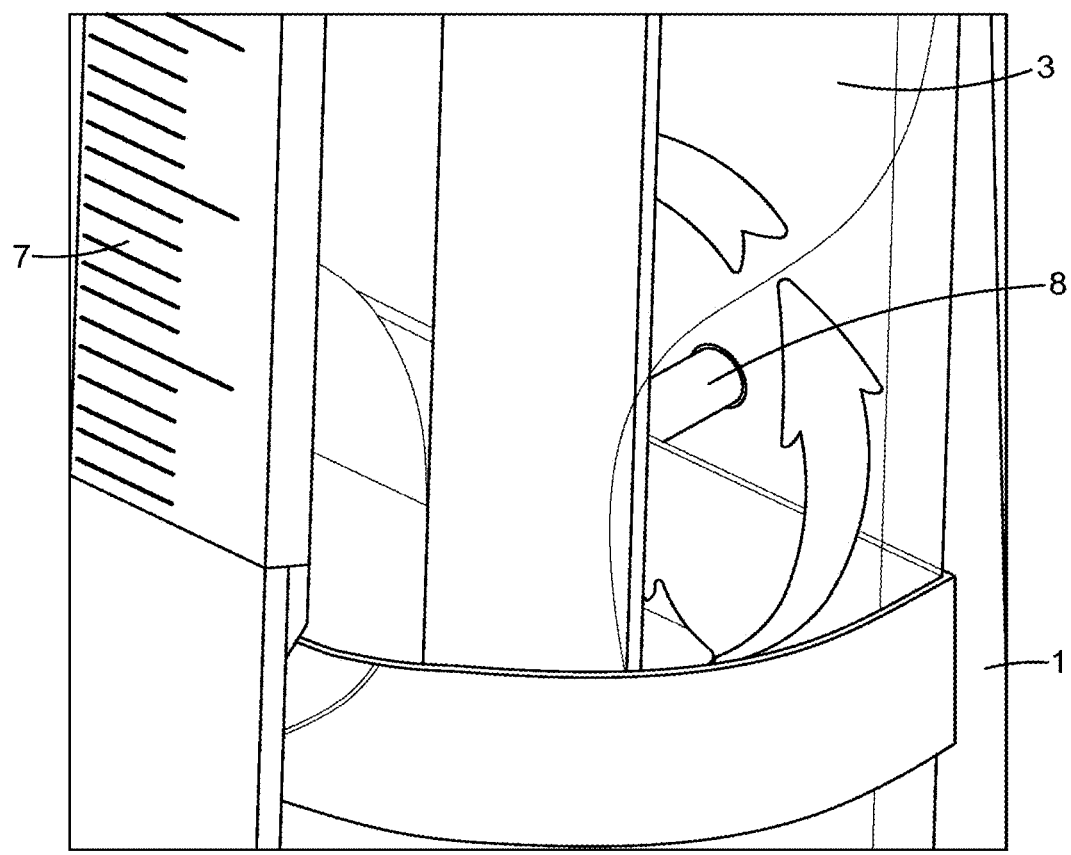
FIG. 3 shows a right front perspective zoomed view of a device within the scope of the invention, illustrating a direction of rotation about a joint.

In reference to FIG. 1 through FIG. 3 inventive devices may comprise two main parts a base 1 and an elongated compartment 2. The base 1 may be removably (or permanently) installed on a wall 9 of a cooling apparatus, e.g., with a magnet, screw, bolt, rivet, adhesive tape/substance (optionally reversible), hook, press-lock, lock-and-key or puzzle-style attachment, or similar affixer. The elongated compartment 2 may be a tubular vessel installed on the base 1 with, e.g., a central joint 8, or two or more optionally symmetrically distributed joints 8.

The joint(s) 8 may allow the elongated compartment 2 to be rotated 180°, 360°, and/or infinitely. Additionally, the joint(s) 8 may allow the elongated compartment 2 to be removed from a cooling device. The elongated compartment 2 is divided into two chambers 3/4 (which may be further divided symmetrically, e.g., by vertical walls, into four, six, or even eight chambers). The upper chamber 3 and the lower chamber 4 by a narrow section 5 in the middle of the elongated compartment 2.

The elongated compartment 2 contains a freezable liquid 6, comprising one, two, three, four, or more phase change materials (PCMs). In operational form, the upper or first chamber 3 of elongated compartment 2, contains the liquid 6, which may then, based on gravity, detect an event in which cooling is suspended and heating occurs. When the temperature rises, the liquid 6 moves from the upper first chamber 3 of the elongated compartment 2 to the lower or second chamber 4. A graduation 7 may be included on the elongated compartment 2, on either or both of the chamber portions, or upon a shell (not enumerated) encapsulating the elongated compartment 2, to enable measurement of the duration (time) at which food was subjected to suspended cooling, elevated temperature, or the like, e.g., by measuring the level of melted liquid 6 collected in the lower or second chamber 4 of the elongated compartment 2. This may allow, for example, an evaluation of a food's validity for consumption.

To reuse the device, the elongated compartment 2, or the measuring device with or without the base, may be removed outside the cooling device to completely melt the liquid 6 and collect it in the lower (second) chamber 4 of the elongated compartment 2, then restore the measuring device to its position, or a new position, in the cooling device until the liquid freezes/solidifies in the lower (second) chamber 4. Thereafter, the elongated compartment 2 is rotated 180° and the lower (second) chamber 4, containing the frozen/solidified liquid 6, is vertically on the top of the elongated compartment, and the formerly upper (first) chamber 3 of the elongated compartment 2 is brought to the vertical bottom.

Presuming the measuring device to have been frozen such that the first chamber 3 is vertically above the second chamber 4, if electricity is, for example, cut off or cooling is otherwise suspended, the temperature within the cooling device will eventually increase, i.e., depending upon thermal factors, including heats of fusion and heat capacities of the volume in the cooled device, heat transfer rates, and the outside environmental temperature, and the liquid 6 will melt. The molten PCM liquid 6 can pass through the narrow section 5 from the upper (first) chamber 3 to the lower (second) chamber 4. The quantity and level of melted liquid 6 can be measured using the graduation 7 to determine the duration of the power failure and then the validity of the refrigerated food.

Figure 4:
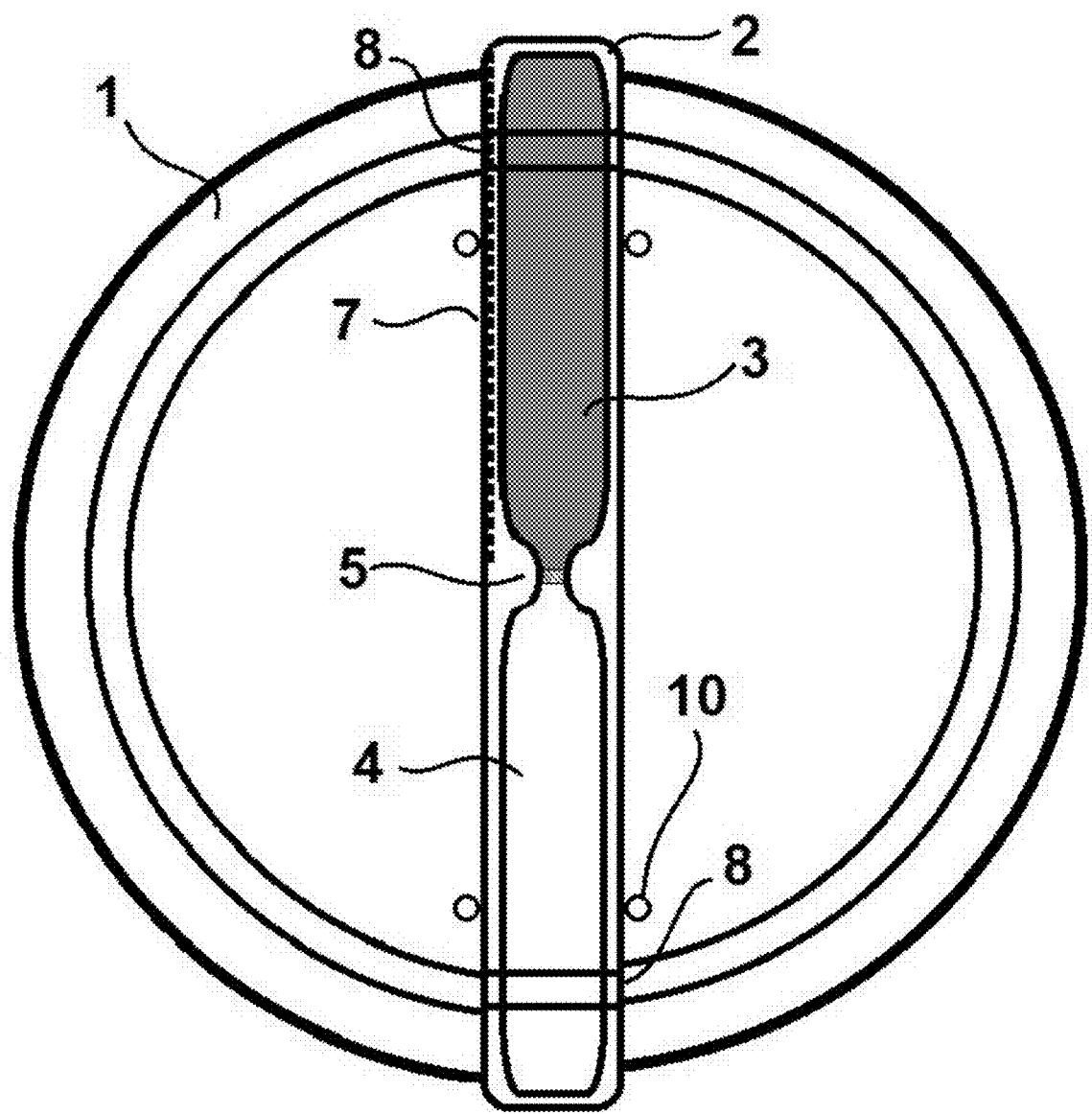
FIG. 4 shows a front elevation of a further measuring device within the scope of the invention having an alternate graduation and being rotatable about a dual joint system with a track.

FIG. 4 illustrates an inventive device having only a graduation 7 over a non-enumerated shell over the first chamber 3, though the graduation 7 may be applied over the second chamber 4, as well or exclusively, or on the outside of the first and/or second chamber 3/4 or internally in the first and/or second chamber 3/4. The duration of suspended cooling can be evaluated based upon diminution of the PCM liquid 6 volume in the first chamber 3. A measuring device as in FIG. 4 has a circular base 1 and two joints 8 which allow the shell, including the elongated compartment 2, to be removed or rotated about the base on a circular path with an axis centered on the narrow section 5. To center the device in the vertical position, four stopper elements 10, e.g., elastomeric bumps, may be included on the base 1.

As shown in FIG. 4, the device has a long dimension (shown vertically in FIG. 4) that is substantially greater than a width dimension of the elongated compartment (2). Preferably the length of the elongated compartment is at least 5 times the width of the elongated compartment, preferably 5-20, 6-18, 7-16, 8-14 times or 10-12 times the width of the elongated compartment. Overall the device is suitably scaled to fit into a practically used heating or cooling apparatus and may have a length of 0.5-25 cm, preferably 1-20, 2-15, 4-12, or 5-10 cm.

Figure 5:
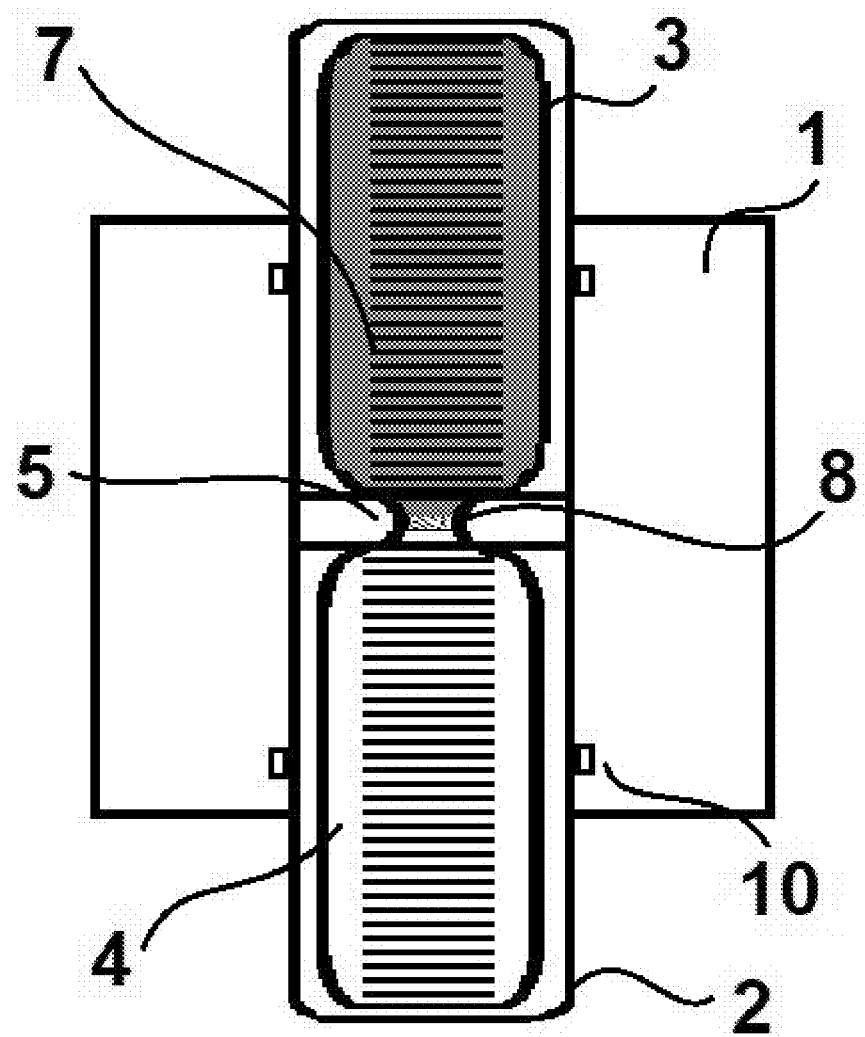
FIG. 5 shows a front elevation of a further measuring device within the scope of the invention.

FIG. 5 illustrates an inventive device having graduation 7 within a non-enumerated shell on the first chamber 3 and the second chamber 4. The duration of suspended cooling can be evaluated based upon diminution of the PCM liquid 6 volume in the first chamber 3 or presence of liquid, optionally re-solidified, in the second chamber 4. This measuring device has a square or rectangular base 1 and a single central joint 8 which allow the shell, including the elongated compartment 2, to be removed or rotated about the base on a circular path with an axis centered on the narrow section 5. To center the measuring device in the vertical position, four stopper elements 10, e.g., elastomeric bumps, may be included on the base 1. The stoppers 10 may have a pyramidal or hemispheric structure, though the centering function of such stoppers may be accomplished in the joint, e.g., having metered rotation.

In some embodiments the device is integral with an insulated heating or cooling compartment. For example, the device may include a mounting portion corresponding with (1) of FIG. 5 that is seamlessly incorporated into a side wall of the compartment. In this respect the invention includes a cooling or heating apparatus comprising an closed interior compartment defined by sidewalls, a top and a bottom, at least one of which may function as a door or opening, and each of which is coated or in contact with an insulating material to prevent or hinder ingress or egress of heat or thermal energy. In one embodiment the device is mounted in the compartment so that the elongated compartment (2) in FIG. 5 is flush with a plane representing an inner surface of the heating or cooling apparatus. In this respect the device is recessed into the insulating wall of the heating or cooling apparatus such that no part of the device protrudes into the compartment beyond a plane of a wall into which the device is seamlessly integrated. Preferably the recess is oval in shape corresponding with the area of rotation represented by a radius representing a dimension slightly longer than one half the length of the elongated compartment (2).

Figure 6:
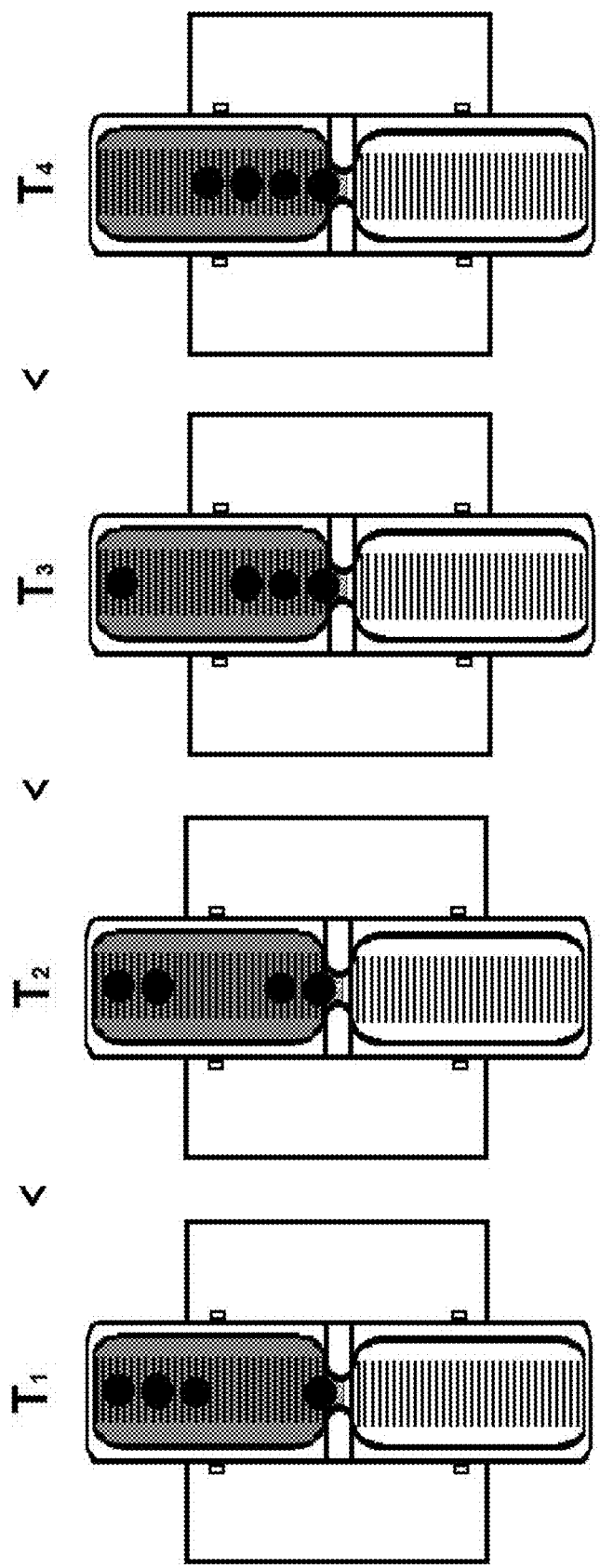
FIG. 6 shows a front elevation of the measuring device of FIG. 5 implementing a Galileo thermometer principle.

FIG. 6 illustrates the measuring device of FIG. 5 in multiple temperature arrays, increasing in temperature form left to right in the figure, whereby a Galileo thermometer-type system of spheres is present in the liquid. The typical Galileo thermometer design allows spheres of fixed density to rise or fall according to the temperature-based expansion (or contraction) of a liquid, and consequent change in density. This arrangement may enhance a measuring device as disclosed herein, particularly what the restoration of cooling is sufficiently rapid to trap the spheres in displacement indicative of a thaw temperature. However, alternate approaches contemplated could include non-miscible or phase-separating PCMs which can take advantage of density changes in two or more PCMs.

Obviously, numerous modifications and variations of the present invention are possible in light of the above teachings. It is therefore to be understood that within the scope of the appended claims, the invention may be practiced otherwise than as specifically described herein.

REFERENCE SIGNS 1 base
2 elongated compartment
3 first chamber
4 second chamber
5 narrow section
6 liquid/liquefied PCM
7 graduation
8 joint
9 wall of cooling device
10 stopper

The invention claimed is:
1. A method of measuring a time period of defrosting in a refrigeration space, the method comprising:
   mounting a defrost and temperature rise indicator to a wall of the refrigeration space,
   wherein the defrost and temperature rise indicator comprises:

an hour glass elongated compartment including a first end and a second end separated by a side wall along a longitudinal axis of the elongated compartment, thereby forming a cavity including only a first chamber and a second chamber that are fluidly connected through a narrow section located between the first and second chambers, wherein at least a portion of the elongated compartment is made of a first transparent material;

a mesh disposed at the narrow section and configured to prevent a movement of a solidified liquid from one chamber to another when the elongated compartment is vertically oriented;

a liquid, comprising a first phase change material and a second phase change material, disposed in the cavity;

a substantially planar base to which the elongated compartment is releasably and rotatably attached, the base being configured to mount the elongated compartment to a wall, the device being substantially planar in a plane parallel to the wall; and a graduation arranged on an outside surface of the elongated compartment suitable for measuring a liquid level in the elongated compartment, wherein the elongated compartment is configured to be rotated about a central axis orthogonal to the base, the first and second chambers being symmetric about the central axis, wherein the base includes at least two stopper elements on opposing sides of the first or second chambers, the at least two stopper elements protruding in a direction orthogonal to the base, and being configured to vertically center the elongated compartment, and vertically aligning the hour glass elongated compartment by rotating the hour glass elongated compartment using a pin releasably and rotatably attaching to the hour glass elongated compartment to the base, allowing the liquid to freeze in a chamber located at a bottom position of the elongated compartment to form a solidified liquid;

rotating the hour glass elongated compartment using the pin to substitute a position of the chamber located at the bottom position of the hour glass elongated compartment with a chamber located at a top position of the hour glass elongated compartment, the solidified liquid melting when a temperature of the refrigeration space rises above a first and a second predetermined temperature in a range of from −20 to 10° C., and the liquid being collected in the chamber located at the bottom position of the hour glass elongated compartment;

measuring a level of the liquid collected in the chamber located at the bottom position of the hour glass elongated compartment with the graduation; and measuring the time period of defrosting in the refrigeration space from the liquid level.

2. The method of claim 1, wherein the base includes a single joint about which the elongated compartment is configured to rotate about the pin.

3. The method of claim 1, wherein base comprises a magnet configured to attach the defrost and temperature rise indicator to the interior wall of the refrigeration space.

4. The method of claim 1, wherein the time period of defrosting in the refrigeration space is measured with a calibration curve that correlates the liquid level to the time period of defrosting.

* * * * *